United States Patent [19]

Scherm

[11] 3,876,757

[45] Apr. 8, 1975

[54] CONTRACEPTION AGENT

[75] Inventor: Arthur Scherm, Bad Homburg, Germany

[73] Assignee: Merz & Co., Frankfurt am Main, Germany

[22] Filed: Mar. 16, 1973

[21] Appl. No.: 341,877

[30] Foreign Application Priority Data

Mar. 21, 1972 Germany............................ 2213604

[52] U.S. Cl.................................. 424/44; 128/271
[51] Int. Cl. ... A61f 15/00; A61k 11/02; A61k 9/02
[58] Field of Search........................ 128/271; 424/44

[56] References Cited
UNITED STATES PATENTS

| | | | |
|---|---|---|---|
| 1,356,544 | 10/1920 | Miller | 128/260 |
| 1,878,766 | 9/1932 | Fitzgerald | 424/44 |
| 2,149,005 | 2/1939 | Bockmuhl et al. | 424/358 X |
| 2,467,884 | 4/1949 | Elias | 424/358 X |
| 2,538,127 | 1/1951 | Saunders et al. | 424/358 X |
| 2,623,841 | 12/1952 | Taub | 424/358 X |
| 2,854,377 | 9/1958 | Elias | 424/44 |
| 2,975,099 | 3/1961 | Goyan et al. | 424/358 X |
| 3,062,715 | 11/1962 | Reese | 424/44 |
| 3,121,663 | 2/1964 | Parker | 424/78 X |
| 3,234,091 | 2/1966 | Lang et al. | 424/358 X |
| 3,244,589 | 4/1966 | Sunnen | 424/45 |

FOREIGN PATENTS OR APPLICATIONS 1,053,615    1/1967    United Kingdom

*Primary Examiner*—Shep K. Rose
*Attorney, Agent, or Firm*—Gordon W. Hueschen

[57] ABSTRACT

A spermicidally-active suppository having advantageous properties comprising spermicide, a water-soluble polyethylene glycol suppository base, foaming agent, and foam-stabilizing agent, having a relatively low percentage by weight of foam-developing agent, wherein the spermicide is an alkylphenoxypolyethoxyethanol, the suppository base comprising about 65 to 85 percent by weight of a water-soluble polyethylene glycol which is meltable at body temperature, and the foaming agent comprising about 10 to 20 percent by weight of a mixture of tartaric acid and sodium bicarbonate, and a method of producing the same, are disclosed.

4 Claims, No Drawings

CONTRACEPTION AGENT

The invention relates to a contraception agent.

In particular, the invention relates to a vaginal suppository for contraception comprising a spermicide and a substance melting at body temperature.

Further the invention relates to a new composition useful for contraception and a process for preparing this composition. A further object of this invention is a method of preventing conception.

For local contraception spermicidal substances of the type of foam-forming tablets, suppositories, and foams are already known.

Thus from U.S. Pat. No. 3,062,715 vaginal tablets comprising effervescent powder and rubber substances (colloids), which are to effect a rapid decomposition of the tablets and hence a rapid disolution thereof, are known. When there is not available sufficient natural secretion upon the use of such tablets, the tablets dissolve only very incompletely, providing insufficient protective effect.

German Pat. No. 893,997 describes vaginal ovulae consisting substantially of a wax-type carrier and a spermicide compound. After melting, this carrier substance, together with the aqueous body liquids, forms a tenacious emulsion of the oil-in-water type, in which the spermicidally-acting substance is not distributed homogeneously. This adversely influences the protective effect.

There are further known foam aerosols consisting of readily-prepared foams. However, the handling of these ready foams is troublesome. For the application thereof, as an additional expedient, a dosing and introducing tube is required. If too little foam is used - which cannot be excluded entirely due to variation in individual application, the protective effect is diminished.

The known means for local contraception are not entirely satisfactory in view of the safe effect desired to be obtained. In particular, with foam tablets or suppositories, the protective effect obtained is strongly dependent upon the existing amount of vaginal secretion and, as the same may vary considerably, the result will be a constant uncertainty.

It is an object of the invention to provide a contraception agent which can easily be introduced into the vagina and which is so composed that there always safely results a large volume of the spermicidally-acting mixture, even if only a small amount of liquid is naturally present within the vagina.

The invention relates to a composition comprising a spermicide, water-soluble poly ethylene glycol which melts at body temperature, and in addition a mixture of substances developing carbon dioxide with water and a foam stabilizer.

Furthermore the invention relates to a process for preparing this composition which comprises melting poly ethylene glycol with a molecular weight of about 1350 together with poly ethylene glycol with a molecular weight of about 1000 within the temperature range from 55°C to 70°C to provide a clear smelt, adding to this smelt the spermicide and dissolving under stirring, thereafter adding waterfree dry tartaric acid and powdery dry sodium lauryl sulfate and stirring for 30 to 45 minutes to provide a uniform suspension, thereafter adding waterfree sodium hydrogen carbonate under stirring to provide a uniform suspension, pouring this suspension in prepared dies and cooling with air to solidificate the mass.

Furthermore the invention relates to the use of the composition of matter as a contraceptiva and to a vaginal suppository made from this composition.

According to the invention the vaginal suppository is useful for contraception comprising a spermicide, water-soluble polyethylene glycol which melts at body temperature, and in addition a mixture of substances developing carbon dioxide with water and a foam stabilizer.

Furthermore the invention relates to a method of preventing conception, which comprises inserting the vaginal suppository according to the invention into the vagina of a woman.

The composition according to the invention provides a double margin of safety upon application — because of the melting and dissolution by formation of foam — this being independent of the amount of vaginal secretion. This effect has been proved not only in vitro, but also in vivo. This safety is further increased by the fact that the vaginal suppository according to the present invention rapidly develops its full effectiveness a very short time after application, and maintains the same over a long period.

According to the invention, preferably a water-soluble polyethylene glycol of suitable chain length or a mixture of different polyethylene glycols, is used as the substance melting at body temperature. A particularly preferred mixture of polyethylene glycol comprises polyethylene glycol with a molecular weight of about 1000 and polyethylene glycol with a molecular weight of about 1350 in equal parts. Another useful mixture comprises equal parts of polyethylene glycol 1050 and polyethylene glycol 1250. As uniform polyethylene fraction the fraction within the molecular weight range from 1100 to 1150 is useful. Such polyethylene glycols, upon melting — if need be along with the vaginal secretion — form a very homogenous foam under the action of the mixture of gas-developing substances.

According to the present invention, as the gas-developing substance mixture is preferably employed a water-soluble organic acid which is solid at room temperature and an alkaline carbonate or an alkaline earth carbonate or alkaline earth bicarbonate such as sodium bicarbonate or carbonate glycine sodium. Further sodium hydrogen tartaric acid, succinic acid or citric acid can be used as organic acid.

A particularly preferred mixture of substances developing carbon dioxide with water according to the invention comprises tartaric acid and sodium hydrogen carbonate.

The substance mixture as stated leads to a sufficient carbon dioxide development without resulting in any physiological and undesired pH values.

Preferably, the mixture is so composed that it is providing the medium with a pH value between 4 and 6 upon dissolution in water.

Admittedly, it has already been proposed to produce suppositories from definite polyethylene glycol mixtures within a composition containing sec.-sodium phosphate and sodium bicarbonate, but such compositions are not suitable as a basis for a vaginal suppository for contraception inasmuch as the composition — on the one hand — does not melt at body temperature and — on the other hand — gives a pH value of 8.8 to the medium upon dissolution in aqueous medium.

It is, in contrast, advantageous for a locally-effective contraception agent of the type concerned that it maintains a slightly acid pH value upon use. Moreover the poor dissolution of suppository bases containing polyethylene glycols had further been recognized.

Preferably, the composition according to the invention contains additionally a foam-stabilizing substance, such as sodium lauryl sulfate, sodium lauryl ether sulfate, or ethoxylised castor oil (Tradename Cremophor E.L. and sold by BASF, Ludwigshafen, West-Germany). This additive assures that, during use, the foam develops evenly and is uniform and constant over a long period of time.

A spermicide particularly suitable for use in the composition according to the invention is the p-nonyl phenyloxy-polyethoxy ethanol, which is known per se for contraception. Other useful spermicides according to the invention are triisopropylene phenoxy polyethoxy ethanol or cetylpryridinium bromide. p-Nonyl phenyloxy. polyethoxy ethanol distributes homogenously in the foam as formed, and is distributed equally and evenly over the entire vagina along with development of the foam. Due to the high foam stability, the safe protective effect is maintained over a period of extremely long duration.

In some cases it is useful to add small amounts of parfum oil. Useful parfum oils are Red Rose No. 065074 sold by DRAGOCO in Holzminden, West-Germany or parfum oil No. 879 sold by Dr. O. Martens, Munchen, West-Germany.

In order to facilitate application of the composition, the contraceptive agent according to the invention is preferably formed in the contours of a longitudinally-shaped body such as a torpedo or an egg, usually having a weight between 2 and 5 grams.

For production of the composition of the invention, a mixture of a polyethylene glycol having a suitable molecular weight or a mixture of different polyethylene glycol fractions, the spermicide, the carbon dioxide-developing substance mixture, the foam stabilizer and, if need be, certain additional substance (parfum oil) is melted at an elevated temperature, and the varous components intimately mixed together by stirring. Without cooling, the liquid mixture is subsequently cast into desired e.g. egg shapes, and cooled to solidificate the mass. A more detailed description of the process according to the invention is disclosed in example 3. The mixture preferably contains 65 to 85 percent by weight of polyethylene glycol, 10 to 20 percent by weight of carbon dioxide-developing substance mixture, 2 to 4 percent by weight of foam stabilizer, and 2 to 5 percent by weight of spermicide.

EXAMPLE 1

1447 parts by weight of polyethylene glycol having a molecular weight of about 1350, 620 parts by weight of polyethylene glycol having a molecular weight of about 1000, 75 parts by weight of p-nonyl phenyloxy polyethoxy ethanol, 200 parts by weight of tartaric acid, 225 parts by weight of sodium bicarbonate, and 80 parts by weight of sodium lauryl sulfate are intimately mixed at 55°C by stirring or squeezing. At this temperature, the mixture to be cast is poured into egg-type dies in which, after cooling to egg-type bodies — ovulae — result. These bodies each weigh approximately 2.45 grams.

EXAMPLE 2

In the polyethylene glycol melt, consisting of 2717 parts by weight of polyethylene glycol 1350 and 1000 at equal parts, 75 parts by weight p-nonyl phenoxy polyethoxy ethanol are being solved. Subsequently 200 parts by weight of tartaric acid, 225 parts by weight of sodium bicarbonate, 80 parts by weight of sodium lauryl ether sulfate and 3 parts by weight of parfum oil are being stirred in and suspended in the melt. The mass is poured into the dies at approximately 55°C.

EXAMPLE 3

A 25 1-containing melting vessel of stainless steel, being provided with a quick-running stirrer and comprising in the vessel wall canals for recycling warm water, is brought to a temperature of between 55°C and 70°C by recycling of thermostated water. In the heated vessel 3,700 gr polyethylene glycol with a molecular weight of approximately 1350 and 3.700 gr polyethylene glycol with a molecular weight of approximately 1000 are being melted under occasional stirring. For acceleration of the melting process, the temperature of the vessel may be kept for several minutes at approximately 70°C. After approximately 30 to 60 minutes a clear homogenous smelt is obtained.

In this clear smelt 225 gr p-nonyl phenoxy polyethoxy ethanol are being introduced and completely dissolved under quick stirring at a stirring velocity of 500 to 800 rotations/min.

To this clear smelt subsequently 600 gr waterfree dry tartaric acid with a fineness of 50 to 800 $\mu$ and 240 gr powdery sodium lauryl sulfate with a fineness of 20 to 300 $\mu$ are being added. It has to be stirred for about 30 to 45 minutes at a stirring velocity of 500 to 800 rotations/min. in order to obtain a uniform suspension. For the properties of this suspension the fineness of the added solid materials is of considerable significance.

Subsequently 675 gr waterfree sodium hydrogen carbonate with a fineness of 50 to 100 $\mu$ and 10 gr fluid parfum oil (parfum oil No. 879 by Dr. O. Martens, Munchen, West-Germany) are added and suspended in this suspension under quick stirring.

The molten end-product is being casted in prepared dies at a temperature of 55° to 60°C.

The filled dies are being cooled in a cooling tunnel with air in the temperature range of −5 to −20°C. Within 12 to 40 minutes the mass is completely solidified. In order to avoid during the cooling a too quick solidification of the mass in the top portion of the dies, this area may be exposed to infra-red light in a dosed amount.

Suitably the dies, into which the molten mass is casted, consist of the final packing material, e.g., of an egg-shaped cover of coated PVC. After the solidification of the mass, these dies are being sealed with an aluminium foil.

Application of the vaginal suppository according to the invention for contraception purposes produces a very desirable safe and protective effect. Clinical tests of the vaginal content a few minutes after intercourse provided in all test cases (44) that no movable sperm could be found within the vagina. Even using a reduced amount of the effective agent (27 per ½ ovulum), in none of the cases were movable sperm found within the vagina. In no case could live sperm be found within the cervical passage. If intercourse was effected immediately after the application (3 cases), still only dead sperm could be found within the vagina and in none of the cases could live sperm be found within the cervical passage. Even after a two-hour waiting time between application and intercourse (8 cases), the samples removed from the vagina contained only immovable semen cells, no live semen cells being found within the cervical passage.

The technical advance of the vaginal suppository according to the present invention also results from the further fact that the same - even if there is only little natural liquid separation present - develops a constant and uniform foam within a few minutes, which foam is dense and remains in place for a long period. This result could not be achieved by means of a known vaginal tablet also containing $CO_2$-developing substances, such as the contraception agent described in U.S. Pat. No. 3,062,715. For reasons of simplicity, the vaginal tablet known under the commercial name Speton (TM) and being composed of:

9,50 mg di-sodium-4-(N-chlorosulfonamido)-benzoate
165,00 mg tartaric acid
170,00 mg sodium hydrogen carbonate
855,50 mg carrying substance has been compared with the present vaginal suppository under identical/conditions for dissolution in different aqueous solutions.

From these tests, it resulted that the vaginal tablet Speton (TM) admittedly began to dissolve with the presence of 0.5 ml of water within 1 to 2 minutes by slowly developing gas (beaker, magnetic stirring means, constant water temperature of 37°C) but that the initially rapid dissolving operation came very quickly to a standstill as the small amount of moisture was bound by the tablet. With the use of 1ml of water, the tablet admittedly dissolved rapidly within a few minutes by strongly developing gas, but formation of foam (as according to the present invention) could not be observed.

The vaginal uvula as claimed in the present invention, under the same conditions, and being composed of:

75 mg p-nonylphenyl-oxy-polyethylene ethanol
200 mg tartaric acid
225 mg sodium hydrogen carbonate
430 mg sodium lauryl sulfate
3 mg parfum oil
2.370 mg carrying substance consisting of a mixture of polyethylene glycol of MW 1000 and polyethylene glycol of MW 1350, was mixed with 0.5 ml of water. Immediately, a slight development of foam started with simultaneous dissolution of the uvula, which development of foam increased constantly. After 15 minutes — (even earlier with the use of 1 ml of water) — the dissolution was completed. The foam formed showed fine pores and was even (photographically objectivated in a colour preparation) and remained as such for at least 90 minutes.

I claim:

1. In a spermicidally active vaginal suppository consisting essentially of spermicide, a suppository base comprising a water-soluble polyethylene glycol, foaming agent, and foam-stabilizing agent, wherein the spermicide is an alkylphenoxypolyethoxyethanol, the improvement which comprises (1) the employment of about 65 to 85 percent by weight of a water-soluble polyethylene glycol which is meltable at body temperature as the suppository base and (2) about 10 to 20 percent by weight of a mixture of tartaric acid and sodium bicarbonate as the foaming agent.

2. A spermicidally active vaginal suppository according to claim 1 consisting essentially of about 2 to 5 percent by weight of p-nonylphenoxypolyethoxyethanol, about 65 to 85 percent by weight of water-soluble polyethylene glycol meltable at body temperature, about 10 to 20 percent by weight of a mixture of tartaric acid and sodium bicarbonate, and about 2 to 4 percent by weight of sodium lauryl sulfate.

3. A spermidically active vaginal suppository according to claim 2 consisting essentially of 2 to 5 percent by weight of p-nonylphenoxypolyethoxyethanol, 65 to 85 percent by weight of a mixture of polyethylene glycol of a molecular weight of about 1350 and polyethylene glycol of a molecular weight of about 1000, 10 to 20 percent by weight of a mixture of tartaric acid and sodium hydrogen carbonate, and 2 to 4 percent by weight of sodium lauryl sulfate.

4. A spermicidally active suppository according to claim 2 having an egg-shaped form and a weight of between 2 to 5 grams and consisting essentially of 2 to 5 percent by weight of p-nonylphenoxypolyethoxyethanol, 65 to 85 percent by weight of a mixture of polyethylene glycol of a molecular weight of about 1350 and polyethylene glycol of a molecular weight of about 1000, 10 to 20 percent by weight of a mixture of tartaric acid and sodium bicarbonate, and 2 to 4 percent by weight of sodium lauryl sulfate.

* * * * *